March 1, 1966 H. H. AIKEN ET AL 3,237,465
ROTARY DETENT INDEXING DEVICE
Filed June 25, 1964
3 Sheets-Sheet 1
FIG.1
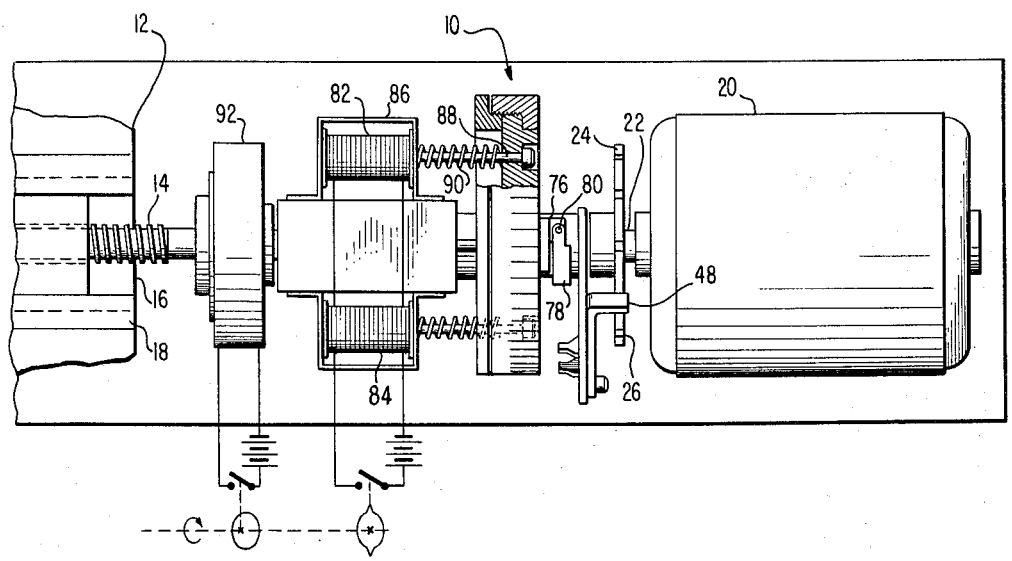
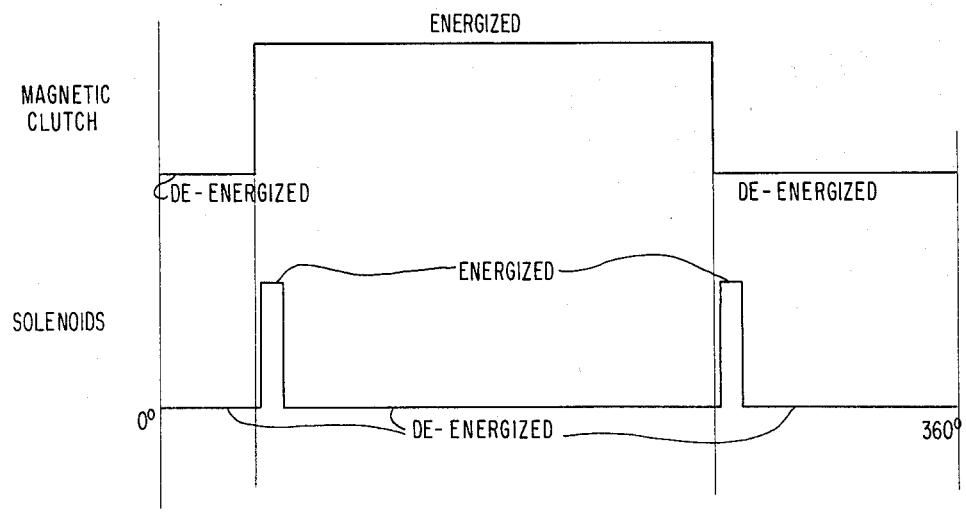
FIG.6
INVENTORS
HOWARD H. AIKEN
ROBERT W. BIRRELL
BY
Sughrue, Rothwell, Mion & Zinn
ATTORNEYS

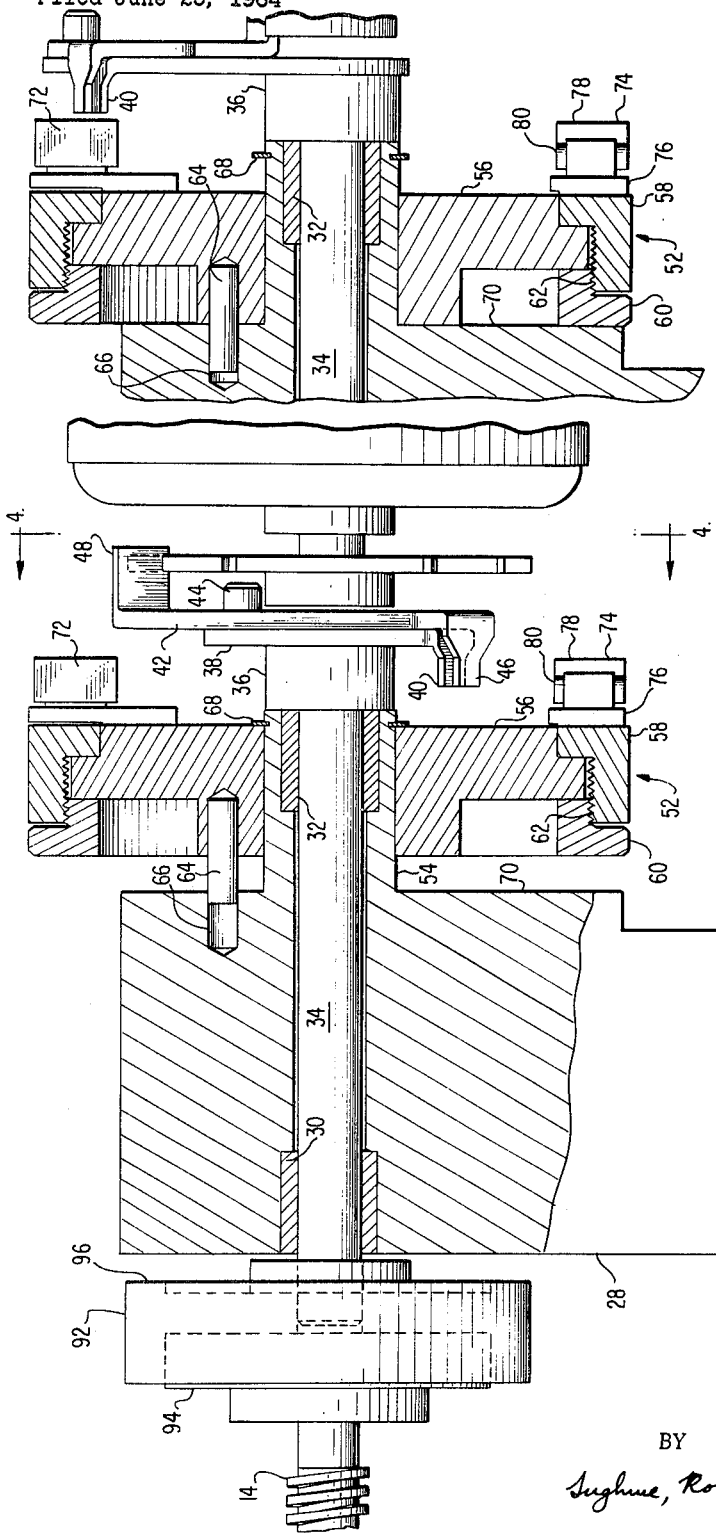

March 1, 1966  H. H. AIKEN ET AL  3,237,465
ROTARY DETENT INDEXING DEVICE

Filed June 25, 1964  3 Sheets-Sheet 3

INVENTORS
HOWARD H. AIKEN
ROBERT W. BIRRELL
BY
Sughrue, Rothwell, Mion & Zinn
ATTORNEYS

United States Patent Office 3,237,465
Patented Mar. 1, 1966

3,237,465
ROTARY DETENT INDEXING DEVICE
Howard H. Aiken and Robert W. Birrell, Carlisle, Pa., assignors to Howard Aiken Industries, Carlisle, Pa., a corporation of Delaware
Filed June 25, 1964, Ser. No. 377,871
5 Claims. (Cl. 74—125.5)

This invention relates to improvements in indexing devices and more particularly to an electromagnetically controlled mechanical rotary detent indexing device.

Indexing devices are quite necessary in a number of different machine arts. It is an object of this invention to provide a precision type indexing device having a high degree of repetitive accuracy and speed and further having means for adjusting precisely the distance of movement during repetitve indexing steps.

It is a further object of this invention to provide an indexing device of the rotary detent type controlled by electromechanical means which is simple and rugged in construction.

Other objects of the invention will be pointed out in the following description and claims and illustrated in the accompanying drawings, which disclose, by way of example, the principle of the invention and the best mode which has been contemplated of applying that principle.

In the drawings:

FIG. 1 is a top plan view of the rotary detent indexing device of this invention with a portion shown in section for the sake of illustration.

FIG. 2 is a side elevation view of the indexing device with a portion shown in section.

FIG. 3 is a fragmentary side sectional elevation view similar to FIG. 2 showing the movement of a control member of the detent device.

FIG. 6 is a timing diagram of the actuation of the magnetic clutch and control solenoids of this invention.

Figure 4:
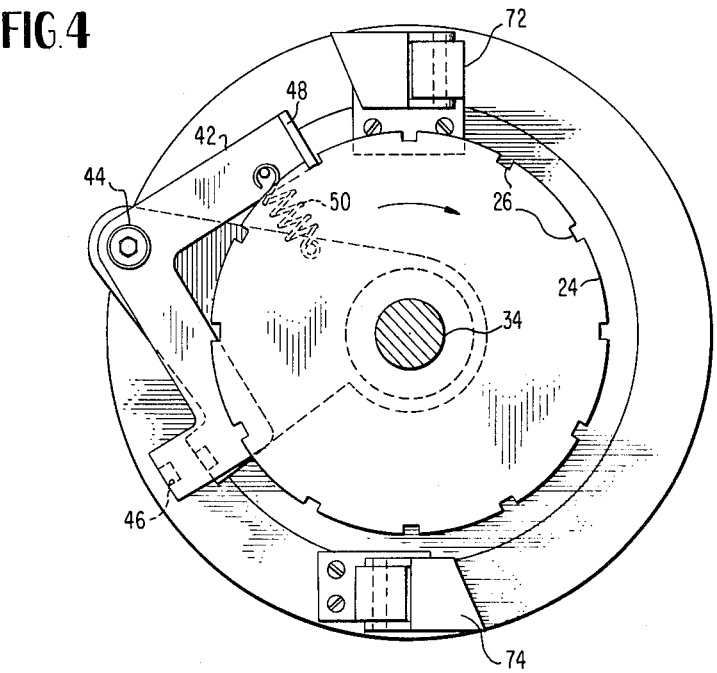
FIG. 4 is a sectional end elevation taken along line 4—4 of FIG. 2.

Referring now to FIG. 1, the index device 10 of this invention is supported from a machine 12 to which the indexing movements are to be applied. In the embodiment illustrated the element indexed may be driven in a stepwise linear manner from a rotary lead screw 14 having a cooperating end 16 threaded thereon and slidable in guides 18. Thus, rotary movements of the index device are translated into precision linear movements by the lead screw and nut arrangement. The invention is thus highly suitable for indexing linear movements although, of course, it need not be limited thereto.

The index device includes a continuously operable drive motor 20 having a drive shaft 22 to which a detent wheel 24 is affixed. As shown for example in FIGS. 4 and 5 the detent wheel 24 has a plurality of spaced notches 26 in the periphery thereof. The detent wheel is thus also continuously rotated with the motor 20.

Rotary index movements are applied to an index shaft 34 rotatably supported in bearings 30 and 32 contained within index shaft support block 28. The index shaft 34 includes a collar 36 at one end thereof. The index shaft collar 36 mounts a detent arm support 38 which is attached thereto by screws or the like, and detent arm support 38 has a projection catch ear 40. A detent arm 42 is mounted from detent arm support 38 by a pivotal connection 44. The detent arm 42 also has a projecting catch ear 46 of generally the same size and shape as projecting catch ear 40 and the other end of pivotable detent arm 42 includes an oppositely projecting pawl 48. A spring 50 attached to the detent arm 42 and to the detent arm support 38 biases the pawl 48 in a direction to engage within a notch 26 in the periphery of detent wheel 24 as shown for example in FIG. 4. Quite obviously, when spring 50 biases detent arm pawl 48 into a notch 26, rotation of motor 20 and detent wheel 24 will cause rotation of detent arm support 38 and index shaft 34. This invention utilizes a unique arrangement for selectively causing the engagement and disengagement of pawl 48 in notches 26 to accomplish precision indexing.

To control the action of the detent there is provided a control member 52 slidably but non-rotatably mounted on an extension 54 of support block 28. The control member 52 includes a reset ring 56 which is mounted on extension 54 and a microdial ring 58 which is adjustably mounted on the periphery of the reset ring 56. The outer periphery of ring 58 contains graduations, for example denoting thousandths of an inch of linear indexing. For retaining the microdial ring 58 and reset ring 56 in a fixed position after they have been angularly adjusted there is provided a rotating ring 60 having a threaded connection 62 with the microdial ring 58.

A pin 64 projecting from the control member 52 is slidable within hole 66 in block 28 to prevent the member 52 from rotating. However, control member 52 is axially movable along extension 54 between the limits of a split ring retainer 68 and the face 70 of block 28.

A zero reset dog 72 is attached to reset ring 56 by screws or the like and an index release dog 74 is similarly attached to microdial ring 58. It can be seen therefore that the angular position between the index release dog 74 and zero reset dog 72 can be adjusted by merely loosening the threaded engagement of retainer ring 60 in microdial ring 58 and rotating the microdial ring with respect to the reset ring 56. In this manner, the angular distance of movement during the indexing may be adjustably and precisely predetermined.

The individual construction of each dog is substantially similar and only one will be described. Each dog includes a base 76 having a projection on which a dog catch 78 is pivotally mounted about pivot 80. Spring means (not shown) are utilized to bias the dog catch 78 outwardly to a predetermined position. As shown for example in FIGS. 4 and 5 the radial distance of the dogs 72 and 74 from the center of the coaxial index shaft is such that it is substantially equal to the radial distance of catch ears 40 and 46 from the center of the index shaft. Thus, if the axial position of the control member 52 is against retaining ring 68 as shown in FIG. 2, the catch ears 40 and 46 will be intercepted by the next dog 72 or 74 as shown also in FIG. 5. However, when the position of control member 52 is against face 70 of block 28 the catch ears 40 and 46 will clear the dogs 70 and 72 as illustrated in FIG. 3.

For axially moving the control member 52 to place the dogs into or out of detent ear engaging position there are provided a pair of solenoids 82 and 84. Since the solenoids are identical only one will be described. Solenoid 82 is mounted within a support bracket 86 and includes a headed solenoid plunger 88 for pulling the control member 52 to the left as view in FIG. 1 and a spring 90 for returning the control member to the right as viewed in FIG. 1. Thus, when the solenoids 82 and 84 are energized the control member is pulled up against the face 70 of block 28 and the dogs 72 and 74 will clear the projecting ears 40 and 46 allowing spring 50 to pull pawl 48 into notch 26 and causing the drive of index shaft 34 from motor 20. However, when springs 90 return the member 52 to a position against rotating ring 68 the dogs 72 and 74 will be in the path of ears 46 and 40 and the next dog will engage the ear releasing the drive via detent arm 42 and immediately stopping the index shaft 34.

At the end of the index shaft 34 there is a magnetic clutch 92 for connecting the shaft 34 to the lead screw 14. The magnetic clutch includes the usual armature portion 94 which is rigid with the lead screw and a magnet portion 96.

FIG. 6 shows the timed operation of the magnetic clutch 92 and the solenoids 82 and 84. The particular circuits for actuating the magnetic clutch and solenoids is interlocked with the circuit of the machine 12 and does not form a part of this invention and therefore has not been illustrated. However, suitable means such as shown in FIG. 1 may be utilized to intermittently actuate the magnetic clutch 92 and solenoids 82 and 84 in timed relation, see FIG. 6 for the timing chart. The solenoids are energized twice; once after the magnetic clutch is energized and once after it is de-energized in order to control the operation of the index release and the zero reset dogs.

The operation of the detent device of this invention is as follows: The distance of movement during the repetitive indexing is first predetermined and adjusted by loosening retaining ring 60 from within microdial ring 58 and adjusting the arcuate distance between dogs 72 and 74. This distance may be conveniently read in thousandths of an inch on a dial on the periphery of the microdial ring 58.

Figure 5:
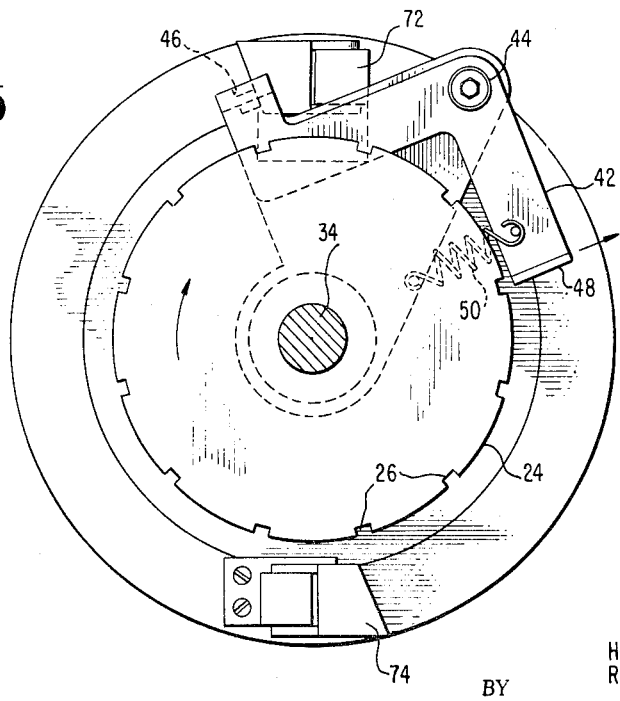
FIG. 5 is a sectional end elevation similar to FIG. 4 showing the release of the detent arm after a predetermined index movement.

The motor 20 is then turned on and it will rotate the detent wheel 24. With detent arm 42 biased by spring 50 so that pawl 48 is within a notch 26 on detent wheel 24, the index shaft 34 will be carried along initially with the rotation of motor 20 until the catch ears 40 and 46 abut against the next apearing dog, which in the embodiment illustrated in zero reset dog 72. Dog 72 is in the path of ears 40 and 46 due to springs 90 biasing control member 52 to the right as viewed in the drawings. As the ear 46 is contacted by the dog 72 as illustrated in FIG. 5 the detent arm 42 will rotate about pivot 44 releasing pawl 48 from notch 26 and allowing the detent wheel 24 to run free while positively stopping the movement also of ear 40 and detent arm support 38 and therefore index shaft 34.

The zero position is now obtained and the arcuate distance between zero reset dog 72 and index release dog 74 will determine the manner of index movement. The magnetic clutch 92 is now energized and the solenoids 82 and 84 are energized for a short period of time as shown in FIG. 6. Energization of the solenoids pulls the control member 52 to the left releasing the ears 40 and 46 and allowing the spring 50 to move the pawl 48 on detent arm 42 into the next appearing notch 26 on detent wheel 24. The detent wheel then carries the index shaft and the clutch lead screw with it for a predetermined arcuate distance. The solenoids 82 and 84 are meanwhile de-energized and the springs 90 return the control member to the right in order that the index release dog will be in the path of the projecting catch ears 40 and 46.

During the rotation of the index shaft 34 up to the point where the ears 40 and 46 abut dog 74 the indexing movement of lead screw 14 takes place through the energization of clutch 92. After a predetermined less than full rotation of the index shaft 34, dog 74 intercepts the ears 40 and 46 again releasing the detent arm 42 from the detent wheel 24 and positively stopping the movement of the index shaft 34. This then accomplishes the index movement.

After a predetermined time, the magnetic clutch 92 is de-energized and the solenoids 82 and 84 are against energized, FIG. 6, causing the member 52 to move to the left releasing the index release dog 74 and allowing the detent arm 42 to again engage the detent wheel until the position of the zero reset dog 72 is reached. However, during this movement the clutch 92 is de-energized as shown in the FIG. 6 timing diagram and there will be no movement of the driven lead screw 14.

If indexing of more than the linear amount obtainable by angular adjustment between dogs 72 and 74 within one revolution is desired, the device can be set to index through two revolutions.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A rotary detent indexing device comprising: a continuously rotatable drive means, a detent wheel positively connected to the drive means to rotate therewith, an intermittently rotatable driven index shaft, a movable detent arm carried by the index shaft and positioned to selectively and positively engage the detent wheel so that the index shaft is selectively driven from the detent wheel, a rotatably fixed and axially positionable control member carrying at least one detent arm engaging dog, the member being axially movable from a position where the dog catches the detent arm to a position where the dog clears the detent arm for selective operation of the arm, and means for axially moving the control member to the separate positions.

2. A rotary detent indexing device comprising: a continuously rotating drive motor, a detent wheel with a plurality of spaced detent notches therein positively connected to the drive motor to continuously rotate therewith, and intermittently rotatable driven index shaft generally coaxial with the detent wheel, a pivotable detent arm carried by the index shaft and biased to engage the notches in the detent wheel, a rotatably fixed and axially shiftable control member carrying a pair of detent arm engaging dogs, the member axially movable from a position where the dogs catch the biased detent arm and move the arm about its pivot against its bias to hold the dogs from engagement with the notches of the detent wheel to another position where the dogs clear and release the detent arm and allow the biased detent to engage the detent wheel, the control member including at least two separate precision angularly adjustable components each carrying one of the pairs of dogs, and spring opposed solenoid means axially moving the control support to the separate shiftable positions.

3. A rotary indexing device as defined in claim 2 further comprising: a driven lead screw and a magnetic clutch selectively clutching the driven lead screw to the intermittently rotatable driven index shaft.

4. A rotary detent indexing device comprising: a rotating driving means carrying a detent wheel, an intermediate index shaft carrying a releasable detent arm and positioned for the detent arm to cooperate with the detent wheel, and electromagnetically actuated control member movable to control the release of the detent arm from the detent wheel, a zero reset dog and index release dog carried by the control member and movable with the control member into a position to intercept movement of the detent arm and release the detent arm from the detent wheel, a driven shaft selectively clutched to the index shaft, means for electromagnetically actuating the control member once and releasing it during a time while the drive shaft is clutched to the index shaft for indexing, and for electromagnetically actuating and releasing the control member while the driven shaft is declutched from the index shaft for resetting to a zero position.

5. A rotary detent index device as claimed in claim 4 wherein the control member comprises: a reset ring carrying the zero reset dog, an index ring carrying the index dog and angularly adjustable relative to the reset ring, and means to clamp the index and reset rings together after appropriate adjustment.

References Cited by the Examiner

UNITED STATES PATENTS

| | | | |
|---|---|---|---|
| 1,582,568 | 4/1926 | Zetterlund | 192—28 |
| 1,674,085 | 6/1928 | Ballard et al. | |
| 1,765,527 | 6/1930 | Gollnick et al. | 192—28 |
| 2,897,679 | 8/1959 | Broatch | 74—125.5 |

BROUGHTON G. DURHAM, *Primary Examiner.*

J. A. MARSHALL, *Assistant Examiner.*